United States Patent [19]

Dawes

[11] Patent Number: 5,182,322

[45] Date of Patent: Jan. 26, 1993

[54] CHLORINATED ETHYLENE COPOLYMER LATEX

[75] Inventor: James W. Dawes, Geneva, Switzerland

[73] Assignee: E. I. Du Pont de Nemours and Company, Wilmington, Del.

[21] Appl. No.: 622,268

[22] Filed: Dec. 5, 1990

[51] Int. Cl.$^5$ .................. C08K 5/11; C08L 31/04
[52] U.S. Cl. .................. 524/308; 524/292; 524/375; 524/563
[58] Field of Search ............ 524/292, 375, 563, 308

[56] References Cited

U.S. PATENT DOCUMENTS

| | | | |
|---|---|---|---|
| 2,727,934 | 12/1955 | Brown | 260/735 |
| 3,437,611 | 4/1969 | Macklin | 260/3.3 |
| 3,513,057 | 5/1970 | Falcone et al. | 156/333 |
| 4,123,477 | 10/1978 | Watanabe et al. | 260/897 |
| 4,299,941 | 11/1981 | Narisawa et al. | 524/563 |
| 4,594,393 | 6/1986 | Pritchett et al. | 525/330.3 |
| 5,057,576 | 10/1991 | Spinelli | 525/288 |

FOREIGN PATENT DOCUMENTS

| | | | |
|---|---|---|---|
| 62-054771 | 3/1987 | Japan | |
| 0964551 | 7/1964 | United Kingdom | 524/563 |

OTHER PUBLICATIONS

G. Dahms & Dr. O. Hafner Paint & Resin Aug., 1988; pp. 13-15.

*Primary Examiner*—Paul R. Michl
*Assistant Examiner*—Andrew E. C. Merriam
*Attorney, Agent, or Firm*—Marilyn H. Bromels

[57] ABSTRACT

A stable binder latex that is substantially free from organic solvents useful for preparing coating compositions for application to a substrate which comprises a chlorinated ethylene vinyl acetate copolymer resin containing up to 16% by weight vinyl acetate, optionally containing acrylic acid or methacrylic acid in amounts of from 5 to 15% by weight, a nonionic surfactant that is an alkyl or aryl ester of polyoxyethylene, an alkyl or aryl ester of polyoxyethylene-polyoxypropylene adducts, an alkylphenoxy polyoxyethylene, or an alkylphenoxy polyoxypropylene-polyoxyethylene adduct that coats microscopic particles of the chlorinated ethylene vinyl acetate copolymer resins thereby preventing the particles from coalescing, and water, preferably the composition contains a low molecular weight plasticizer.

11 Claims, No Drawings

CHLORINATED ETHYLENE COPOLYMER LATEX

BACKGROUND OF THE INVENTION

The present invention is directed to stable latexes used in the preparation of coating compositions that are substantially free from organic solvents.

Coating compositions containing chlorinated rubber binders used, for example, in marine paint formulations also contain substantial amounts of organic solvents. Due to the health hazards and environmental constraints associated with certain organic solvents, coating formulations with low volatile organic compound (VOC) concentration or formulations substantially free from organic solvents are needed. However, without the addition of organic solvents to dissolve or disperse the binder for use in coating compositions, such as paints, it is difficult to keep the binder adequately dissolved or dispersed. There is thus a need for low VOC coating compositions derived from stable chlorinated rubber emulsions substantially free from organic solvents.

SUMMARY OF THE INVENTION

The present invention relates to a stable binder latex substantially free from organic solvents useful for preparing coating compositions for application to a substrate which comprises 100 parts by weight of a chlorinated ethylene vinyl acetate copolymer resin containing up to 16% by weight vinyl acetate, optionally containing acrylic acid or methacrylic acid in amounts of from 5-15% by weight, wherein the ethylene vinyl acetate copolymer resin prior to chlorination has a melt flow index of at least about 1500 g/10 minutes, 6-14 parts by weight based on 100 parts by weight of chlorinated ethylene vinyl acetate copolymer resin of a nonionic surfactant selected from the group consisting of alkyl or aryl esters of polyoxyethylene, alkyl and/or aryl esters of polyoxyethylene-polyoxypropylene adducts, alkylphenoxy polyoxyethylenes, or alkylphenoxy polyoxypropylene-polyoxyethylene adducts or mixtures thereof that coat microscopic particles of chlorinated ethylene vinyl acetate copolymer resins thereby preventing the particles from coalescing, and water.

The stable latexes are prepared by adding water and nonionic surfactant to a solution of the chlorinated ethylene vinyl acetate copolymer resin in an organic pre-emulsion solvent in a high shear emulsifier. Water is added in incremental amounts which converts the resulting highly viscous water-in-oil emulsion initially formed to a low viscosity oil-in-water emulsion. The organic pre-emulsion solvent is removed and a stable latex of the chlorinated ethylene vinyl acetate copolymer resin is obtained.

DETAILED DESCRIPTION OF THE INVENTION

The chlorinated ethylene vinyl acetate copolymer resins used as the binder materials are prepared from ethylene/vinyl acetate copolymer resins, optionally copolymerized with acrylic or methacrylic acid, having a melt flow indexes of at least about 1,500 and no more than about 10,000, g./10 minutes, determined according as ASTM D-1234-65T, revised 1965 (Condition E), and having a vinyl acetate content up to 16% by weight, usually from about 7-16% by weight. If the amount of acetate groups in the copolymer is more than about 16% by weight, the composition is difficult to process. After chlorination of the ethylene/vinyl acetate copolymer resin by conventional means, the chlorine content of the chlorinated ethylene/vinyl acetate is from about 30-65% by weight, preferably 35-60% by weight.

The chlorinated ethylene/vinyl acetate copolymer resins are made by a process which comprises dissolving an ethylene/vinyl acetate copolymer resin, both dipolymers and terpolymers, having a vinyl acetate content up to 16% by weight in an organic solvent, for the copolymer resin, e.g., carbon tetrachloride or methylene chloride, and adding the chlorinating agent, gaseous chlorine, to the resulting solution to produce a chlorinated ethylene/vinyl acetate copolymer. The amount of gaseous chlorine used in the process is determined by the required degree of chlorination. Generally, between about 0.5-2 parts by weight gaseous chlorine per 1 part by weight ethylene/vinyl acetate copolymer resin is used to incorporate the desired amount of chlorine atoms on the copolymer.

Optionally, the chlorinated ethylene/vinyl acetate copolymer resin can be a terpolymer containing units of acrylic acid or methacrylic acid. Generally, the addition of about 5-15% by weight acrylic or methacrylic acid preferably 7-13% by weight, is incorporated in the terpolymer. The acrylic or methacrylic acid serves to provide pendant carboxyl groups which act as cure sites on the copolymer. The upper limit on the amount of acrylic acid or methacrylic acid is imposed by the desired shelf-life of coating formulations based on the terpolymers and the lower limit is based on the ability to produce an adequate cure.

The chlorinated ethylene copolymers, including the dipolymers, ethylene/vinyl acetate, and terpolymers, ethylene/vinyl acetate/methacrylic acid or acrylic acid, are formed into a stable latex by a phase inversion process. The chlorinated ethylene copolymer, with other optional ingredients, e.g., a plasticizer, forms a solution with an organic solvent, preferably having a boiling point below that of water, such as methyl ethyl ketone or carbon tetrachloride. In forming the stable latex of the invention solid chlorinated ethylene copolymers can be dissolved in the pre-emulsion solvent or a solution of the chlorinated polymer in an organic solvent can be used. This solution of polymer and surfactant, and other ingredients, is blended in a high shear emulsifier apparatus to which water is incrementally added. Initially, the resulting mixture forms a water-in-oil emulsion of high viscosity which, upon continued addition of water, converts the mixture to a low viscosity oil-in-water emulsion. The organic pre-emulsion solvent is evaporated by conventional techniques, e.g., stripping techniques, such as vacuum evaporation.

The surfactants used in the present invention are added and incorporated in the latex in amounts of from about 6-14 parts by weight, per 100 parts of chlorinated ethylene vinyl acetate copolymer resin usually 8-12 parts by weight. The surfactants used to form a stable latex are all nonionic phenolic or ester surfactants and are alkyl or aryl esters of either polyoxyethylene or polyoxyethylene-polyoxypropylene adducts, or they may be alkylphenoxy polyoxyethylenes, or alkylphenoxy polyoxypropylene-polyoxyethylene adducts. Mixed alkyl-aryl esters of polyoxyethylene-polyoxypropylene adducts are preferred. Generally the alkyl group in the alkyl phenoxy surfactants contains 3-15 carbon atoms, usually 7-10 carbon atoms and generally the alkyl group in the ester surfactants contains 10-24 carbon atoms, preferably 16-20 carbon atoms and the aryl groups of the aryl ester surfactants contain 8-15 carbon atoms, preferably 8-10 carbon atoms. The surfactant coats the microscopic particles of the chlorinated ethylene/vinyl acetate resin to prevent the particles from coalescing. Representative surfactants include alkylphenoxy polyoxyethylene-polyoxypropylene (Atlas G 4809) and polyoxyethylene-polyoxypropylene sorbitan linoleic phthalic ester (Atlas G 1350), and the alkylphenoxy polyoxyethylenes, polyoxyethylene nonylphenol (Superonic NP12 and Superonic NP15) all of which are available from Imperial Chemical Industries.

Usually, and preferably, a hydrophobic plasticizer for the chlorinated ethylene/vinyl acetate copolymer resins is added to and incorporated in the resin. The plasticizers are low molecular weight compounds which are chlorinated aliphatic hydrocarbons or polymeric esters. These plasticizers, either as liquids or solids, are added to the high shear mixer containing the chlorinated ethylene vinyl acetate copolymer resin in amounts of from about 20-60 parts per 100 parts chlorinated polymer, preferably 30-50 parts per 100 parts chlorinated polymer. If less than about 20 parts plasticizer is used, then the coating tends to be brittle. If more than 60 parts plasticizer is used then, the coating is soft and scratches easily. The chlorinated aliphatic hydrocarbons are preferred and they have molecular weights of 300-2000, preferably 400-1000, and chlorine contents of 20-70 weight percent, preferably 50-65 weight percent. The polymeric esters have a number average molecular weight of about 300-2000. If the molecular weight of the plasticizer is too high, then the film does not coalesce properly. The chlorine level of the chlorinated aliphatic hydrocarbon is important because it determines whether the chlorinated hydrocarbon will be compatible with the chlorinated polymers. Among the chlorinated aliphatic hydrocarbon plasticizers that can be used in the latex composition are chlorinated paraffins such as Cereclor 42, containing 42% by weight chlorine and derived from a mixture of paraffins containing about 20-35 carbon atoms, which has an approximate molecular weight of 530, available from Imperial Chemical Industries, Cereclor 70 or 70L, chlorinated paraffins which contain 70 weight percent chlorine, and Cereclor 52, a chlorinated paraffin containing 52 weight percent chlorine. Other chlorinated paraffins that can be used in the latex include "Chlorowax 50" a chlorinated paraffinic plasticizer containing about 48 weight percent chlorine, molecular weight 635, "Chlorowax 60-70" chlorinated paraffinic plasticizer containing about 60 weight percent chlorine, and "Chlorowax LV" paraffinic plasticizer containing 39 weight percent chlorine which has a molecular weight of 545. Representative plasticizers that are polymeric esters which can be used in the latex are generally reaction products of glycols and long-chain saturated and unsaturated fatty acids such as ethylene, propylene or pentaerythritol glycols and fatty acids, such as stearic, linoleic, palmitic and capric. The chlorinated aliphatic hydrocarbon plasticizers are preferred since they have no adverse effect on the water sensitivity of coatings derived from the chlorinated copolymer latex.

The above-described latex can be formulated in substantially solvent-free coating compositions, either clear or pigmented, by any conventional means by the addition of fillers on, for example, a ball mill. The pigments used in the formulation can be any of the conventional types used in coating compositions and include, for example, iron oxides, lead oxides, strontium chromate, titanium dioxide, barium sulfate, as well as color pigments, including cadmium yellow, cadmium red, chromium yellow, and metallic pigments such as aluminum flake and zinc dust. Conventional fillers can be incorporated in the latex. Representative fillers include calcium carbonate, clay, talc, carbon black, and coal dust.

The latex is mixed with the fillers and pigments usually in the presence of small amounts, e.g., 5-15% by weight of the weight of the dry film, of organic coalescing agents, which are, for example, dimethyl esters of adipic, glutaric and succinic acids, hexylene glycol, methyl proxitol acetate, to produce a low VOC coating composition. The coating compositions contain about 25 to 200 parts by weight, usually 50-100 parts by weight, fillers and pigments based on 100 parts by weight of chlorinated polymer binder. The water evaporates after the coating composition, e.g., paint, is applied to a substrate leaving the solid materials that form a film or coating.

In addition, antioxidants, U.V. light absorbers, corrosion inhibitors, flow control agents and other formulating additives can be used in the coating composition, if desired. These materials can be present, optionally, in amounts up to 90% by weight based on the total solids in the coating composition.

The coating composition can be designed for application by spraying, brushing, dipping, or flow coating. The coating compositions can be applied over any substrate including wood, metal, glass, cloth, plastics and the like, as well as over various primers. The coating compositions are particularly useful on substrates such as metal and fabrics.

In general, coating thicknesses of the composition on the substrate will vary depending on the particular application desired. Usually coatings of from 0.005-1 mm thick have been found to be satisfactory for most application.

EXAMPLES

EXAMPLE 1

One hundred parts of chlorinated ethylene vinyl acetate copolymer (14% vinyl acetate; melt index prior to chlorination, 2500; 58% chlorine) dissolved in 133 parts methyl ethyl ketone and containing 10 parts polyoxyethylene polyoxypropylene sorbitan linoleic phthalic ester (Atlas G1350 Surfactant, available from ICI Europa, Ltd.) was placed in a Silverson high shear mixer and emulsified with 200 parts water, added in 5 ml aliquots over a period of 30 minutes. After the addition was complete, methyl ethyl ketone was removed from the emulsion using a rotary evaporator to yield a stable chlorinated ethylene vinyl acetate copolymer latex substantially free of organic solvent useful as a binder for coating compositions such as paints.

EXAMPLE 2

Seventy parts of a chlorinated copolymer of ethylene, vinyl acetate, and acrylic acid (37% chlorine, 7.1% vinyl acetate, 6.8% acrylic acid, melt index 2500 prior to chlorination) dissolved in 100 parts methyl ethyl ketone and containing 7 parts polyoxyethylene polyoxypropylene alkyl phenol (Atlas G4809 Surfactant, available from ICI Europa, Ltd.), 35 parts titanium dioxide, and 30 parts melamine formaldehyde resin (Cymel 350, available from Charles Tennant & Co., London, U.K.) was passed through a paint mill to grind the pigment to a particle size of less than 10 microns as measured by a Hegman gauge. The resultant mixture was emulsified in a Silverson high shear mixer while adding 100 parts of water in 5 ml aliquots. Organic solvent was removed from the emulsion with a rotary evaporator to yield a stable chlorinated ethylene/vinyl acetate/acrylic acid copolymer latex.

Coated aluminum sample panels (76×127×0.5 mm) were prepared by drawdown of the chlorinated ethylene/vinyl acetate/acrylic acid copolymer latex using a wire-wrapped bar to produce a coating thickness of 200 microns. The sample panels were placed in an oven for 0.5 min. at 200° C. to cure the coating. The resultant cured films had a 60° gloss of 89, on a standard gloss meter, the film had adequate hardness, and had excellent resistance to xylene solvents which indicates a high state of cure and the coating had excellent flexibility and crack resistance.

EXAMPLE 3

Seventy parts of chlorinated ethylene vinyl acetate copolymer (58% chlorine, 6.8% vinyl acetate; melt index prior to chlorination, 5000) dissolved in 65 parts methyl ethyl ketone and containing 7 parts polyoxyethylene polyoxypropylene alkyl phenol (Atlas G4809 Surfactant, available from ICI Europa, Ltd.), 20 parts Cereclor 70L chlorinated paraffin, and 10 parts Cereclor 42 chlorinated paraffin (both available from ICI Europa, Ltd.) was placed in a Silverson high shear mixer and emulsified with 150 parts water, added in 5 ml aliquots over a period of 30 minutes. After the addition was complete, methyl ethyl ketone was removed from the emulsion using a rotary evaporator to yield a stable chlorinated ethylene vinyl acetate copolymer latex substantially free of organic solvent useful as a binder in paint compositions.

I claim:

1. A stable binder latex substantially free from organic solvents useful for preparing coating composition for application to a substrate which comprises 100 parts by weight of a chlorinated ethylene vinyl acetate copolymer resin containing up to 16% by weight vinyl acetate, wherein the ethylene/vinyl acetate copolymer resin, prior to chlorination, has a melt flow index of at least 1500 g/10 minutes, 6–14 parts by weight per hundred parts chlorinated ethylene vinyl acetate copolymer resin of a nonionic surfactant selected from the group consisting of alkyl or aryl esters of polyoxyethylene, alkyl and/or aryl esters of polyoxyethylene-polyoxypropylene adducts, alkylphenoxy polyoxyethylenes, or alkylphenoxy polyoxypropylene-polyoxyethylene adducts or mixtures thereof that coat microscopic particles of the chlorinated ethylene vinyl acetate copolymer resins thereby preventing the particles from coalescing, and water.

2. A stable latex of claim 1 wherein the surfactant is an alkyl-aryl ester of polyoxyethylene-polyoxypropylene adducts.

3. A stable latex of claim 2 wherein the surfactant is a polyoxyethylene-polyoxypropylene sorbitan-linoleic phthalic ester.

4. A stable latex of claim 1 wherein the surfactant is an alkylphenoxy polyoxyethylene.

5. A stable latex of claim 1 wherein the surfactant is a polyoxyethylene nonyl phenol.

6. A stable latex of claim 1 wherein the copolymer is chlorinated esthylene vinyl acetate.

7. A stable latex of claim 5 wherein the copolymer is chlorinated ethylene vinyl acetate.

8. A stable latex of claim 1 that contains about 20–60 parts per 100 parts chlorinated copolymer of a chlorinated aliphatic hydrocarbon plasticizer having a number average molecular weight of about 300–2000.

9. A stable latex of claim 8 wherein the plasticizer is a chlorinated paraffin.

10. A stable binder latex of claim 1 wherein the chlorinated ethylene vinyl acetate copolymer is a terpolymer which contains copolymerized units of acrylic acid in amounts of 5–15% by weight.

11. A stable binder latex of claim 1 wherein the chlorinated ethylene vinyl acetate copolymer is a terpolymer which contains copolymerized units of methacrylic acid in amounts of 5–15% by weight.

* * * * *